United States Patent [19]
Nishijima et al.

[11] Patent Number: 5,138,505
[45] Date of Patent: Aug. 11, 1992

[54] TRACKING APPARATUS FOR A MAGNETIC RECORDING AND PLAYBACK APPARATUS WITH INDEPENDENT CONTROL OF AUDIO HEAD WITH RESPECT TO VIDEO HEAD

[75] Inventors: Hideo Nishijima; Kaneyuki Okamoto; Katsuyuki Watanabe; Tomishige Yatsugi, all of Ibaragi, Japan

[73] Assignee: Hitachi, Ltd., Tokyo, Japan

[21] Appl. No.: 454,957

[22] Filed: Dec. 22, 1989

[30] Foreign Application Priority Data

Dec. 27, 1988 [JP] Japan .................................. 63-328054

[51] Int. Cl.⁵ ............................................. G11B 5/592
[52] U.S. Cl. .................................................. 360/77.16
[58] Field of Search .................... 360/77.16, 77.17, 70, 360/71, 77.14

[56] References Cited

U.S. PATENT DOCUMENTS 4,882,635 11/1989 Sanai .................................. 360/77.16

Primary Examiner—Aristotelis Psitos
Assistant Examiner—David L. Robertson
Attorney, Agent, or Firm—Antonelli, Terry, Stout & Kraus

[57] ABSTRACT

A tracking apparatus for a magnetic recording and playback device of a helical scan system including at least one audio head and at least one video head provided on a rotating cylinder for enabling recording and playback of an audio signal and a video signal onto and from a magnetic tape which is driven by a capstan motor. The tracking apparatus includes a tracker for detecting an audio tracking error of the audio head for an audio track of the magnetic tape and for generating a tracking compensation signal corresponding to the amount of audio tracking error, and a controller responsive to the tracking compensation signal for controlling the rotary phase of the capstan motor in accordance therewith so that the audio head correctly tracks the audio track of the magnetic tape and is controlled independently of control of the video head for video tracking error.

9 Claims, 8 Drawing Sheets

TRACKING APPARATUS FOR A MAGNETIC RECORDING AND PLAYBACK APPARATUS WITH INDEPENDENT CONTROL OF AUDIO HEAD WITH RESPECT TO VIDEO HEAD

BACKGROUND OF THE INVENTION

The present invention relates to a magnetic recording and playback device of a helical scan system in which both a video signal and an audio signal are recorded on or played back from a magnetic tape utilizing rotary heads, and more particularly to a tracking apparatus for a magnetic recording and playback device in which an audio signal is recorded on a deep layer of a magnetic tape and a video signal is recorded on a shallow layer of the magnetic tape.

In order to have a good quality played back audio signal, even in a long-play mode in which a magnetic tape is run slower than in a normal mode, the technique in which recording and playback of an audio signal is performed with a rotary head is known. The technique is, for example, described in Japanese Patent Application Laid-Open No. 38907/84, in which a video head for recording and playback of video signals and an audio head for recording and playback of audio signals are mounted on a rotating cylinder, and after an audio signal is recorded on a magnetic tape, a video signal is recorded on the same track. In this case an audio signal is recorded on a deep layer of the magnetic tape and a video signal is recorded on a shallow layer.

FIG. 9 shows the track pattern on a magnetic tape 1 formed as described above wherein 88 is a control track, 89 is an audio track and 90 is a video track. In this figure, an audio head precedes to forms an audio track 89 on the magnetic tape and thereafter a video head form a video track 90 over the audio track 89. In this case, an audio signal is recorded on a deep layer of the magnetic tape 1 and a video signal is recorded on a shallow layer. A control track 88 is formed by a control head. In a playback mode, an audio head scans the audio track 89 for the playback of an audio signal and a video head scans the video track 90 for the playback of a video signal. At this time, a control signal is played back from the control track 88 with the control head and the tracking control of an audio head and a video head is performed with the control signal.

An example of an automatic tracking system is shown in Japanese Patent Application Laid-Open No. 41114/79 wherein it is intended to obtain good tracking even in the cases of occurrence of expansion and contraction of a magnetic tape, variations in height of control heads among magnetic recording and playback devices, or variation in the tape tension. A control signal is formed from the phase difference between a pulse expressing the rotary phase of a rotating cylinder and a playback control signal, wherein the phase of a playback control signal is automatically adjusted corresponding to the level of a played back video signal, and tracking control is performed with the phase-controlled control signal and the pulse expressing the rotary phase of the rotating cylinder. It is, therefore, made possible that a video head can obtain good tracking even in the cases where there are different variations as mentioned above.

When a video signal and an audio signal are recorded as shown in FIG. 9, the relative position between a video track 90 and an audio track 89 is set to be a fixed value for the interchangeability among magnetic recording and playback devices. But because of variations in head width, in level differences of heads or in dispositions of heads, it is difficult to make the relative positions between the tracks 89 and 90 of all magnetic recording and playback devices be the same and some differences among the devices cannot be avoided. In particular, the difference in the relative positions becomes large in a long-play recording mode.

When a magnetic tape which is recorded with a different magnetic recording and playback device is to be played back, if the relative position between an audio track 89 and a video track 90 has a fixed value, it is theoretically possible to put an audio head correctly on an audio track and to put a video head correctly on a video track with the above-mentioned prior art. Actually, however, there is variation in the construction or differences in head positions among different magnetic recording and playback devices, so that it is essentially impossible to ensure that a video head and an audio head are placed in correct tracking conditions simultaneously. In other words, if a video head is placed in a good tracking condition, a tracking error is caused in an audio head, and if an audio head is placed in a good tracking condition, a tracking error is caused in a video head.

SUMMARY OF THE INVENTION

It is therefore an object of the present invention to overcome the problems of the prior art and to provide a tracking apparatus for a magnetic recording and playback device in which both a video head and an audio head mounted on a rotating cylinder can be held in correct tracking conditions simultaneously.

In accordance with the present invention, a magnetic recording and playback apparatus utilizing at least one rotary video head and at least one rotary audio head is provided with a first tracking arrangement for generating a tracking compensation signal for controlling the rotary phase of a capstan motor corresponding to the magnitude of the audio tracking error by detecting an audio head tracking error for an audio track on a magnetic tape so that the audio head tracking is controlled independently of control of the video head for tracking error.

According to the present invention, the apparatus also includes a displacement device for displacing a video head in the width direction of a track, and a second tracking arrangement for detecting a tracking error of a video head for a video track on the magnetic tape and for controlling the displacement device corresponding to the magnitude of the detected tracking error.

According to features of the present invention, when the dislocation of an audio head from an audio track on a magnetic tape is detected with the first tracking arrangement, the rotary phase of a capstan motor is controlled corresponding to the magnitude of the dislocation to change the running phase of the magnetic tape, and an audio head is placed in a good tracking condition for the audio track. When the dislocation of a video head from a video track on a magnetic tape is detected with the second tracking arrangement, the displacement device is controlled corresponding to the magnitude of the dislocation to displace the video head in the direction of track width, and a video head is controlled so as to be placed in a good tracking condition on a video track.

The tracking error of an audio head and that of a video head are detected independently with the first tracking arrangement and the second tracking arrangement, respectively, and the tracking of the audio head is controlled independently of the video head. Thereby, even though the relation between an audio track and a video track varies with every magnetic tape, both the audio head and the video head can be placed in good tracking conditions for a respective magnetic tape.

The above and other objects, features, and advantages of the present invention will become more apparent from the following description when taken in connection with the accompanying drawings which show, for the purpose of illustration only, several embodiments in accordance with the present invention.

DETAILED DESCRIPTION OF THE PREFERRED EMBODIMENTS

Figure 1:
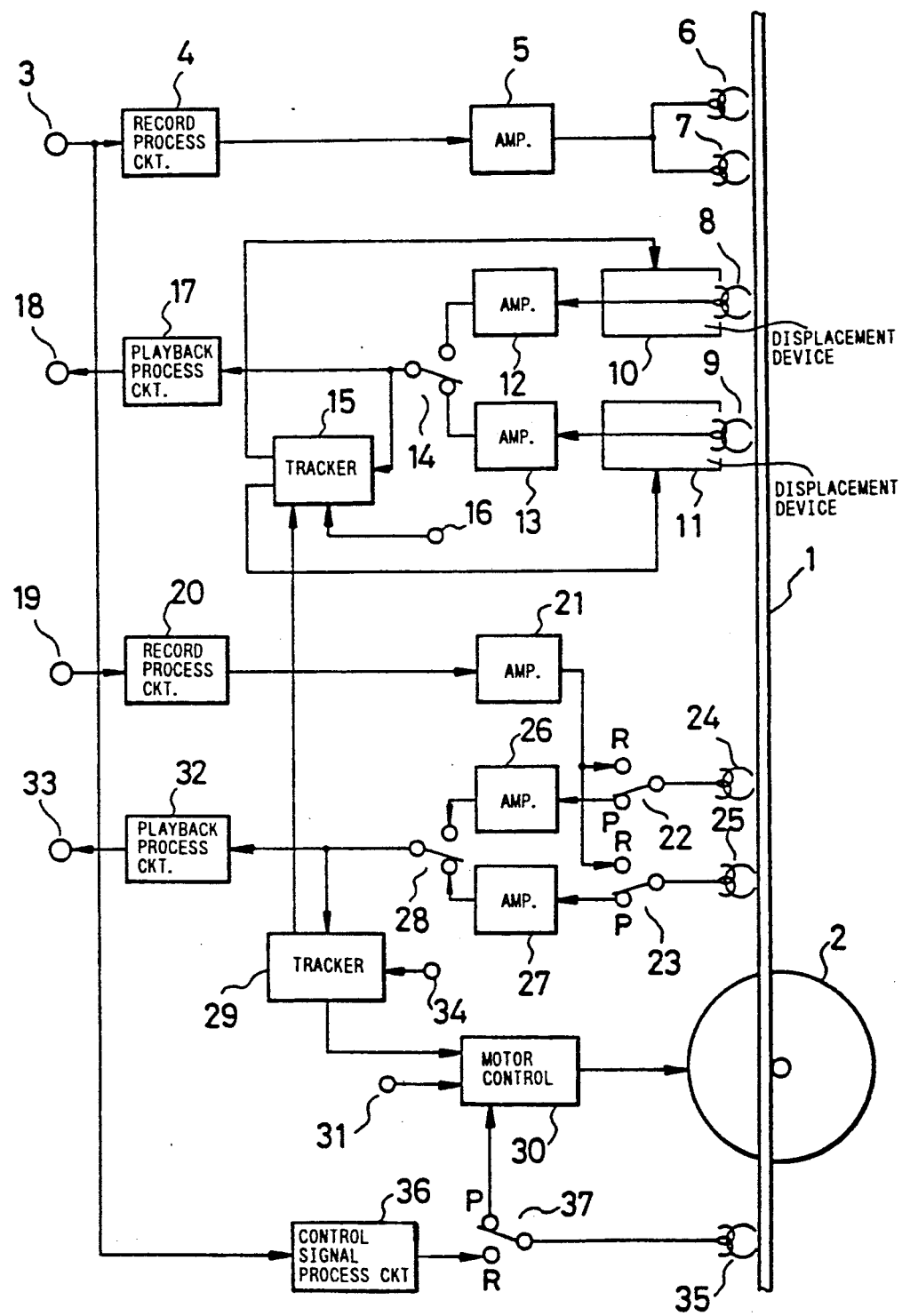
FIG. 1 illustrates, in block diagram form, an embodiment of a tracking apparatus for a magnetic recording and playback device according to the present invention.

FIG. 1 illustrates an embodiment of a tracking apparatus for a magnetic recording and playback device according to the present invention wherein 1 is a magnetic tape, 2 is a capstan motor, 3 is a video signal input terminal of a video signal, 4 is a recording process circuit, 5 is a recording amplifier, 6 and 7 are recording video heads, 8 and 9 are playback video heads, 10 and 11 are displacement devices, 12 and 13 are playback amplifiers, 14 is a switching circuit, 15 is a tracking arrangement, 16 is a control signal input terminal, 17 is a playback process circuit, 18 is a video signal output terminal, 19 is an audio signal input terminal, 20 is a recording process circuit, 21 is a recording amplifier, 22 and 23 are switching circuits, 24 and 25 are audio heads, 26 and 27 are playback amplifiers, 28 is a switching circuit, 29 is a tracking arrangement, 30 is a motor control circuit, 31 is a reference signal input terminal, 32 is a playback process circuit, 33 is an audio signal output terminal, 34 is an input terminal, 35 is a control head, 36 is a control signal process circuit, and 37 is a switching circuit.

Figure 9:
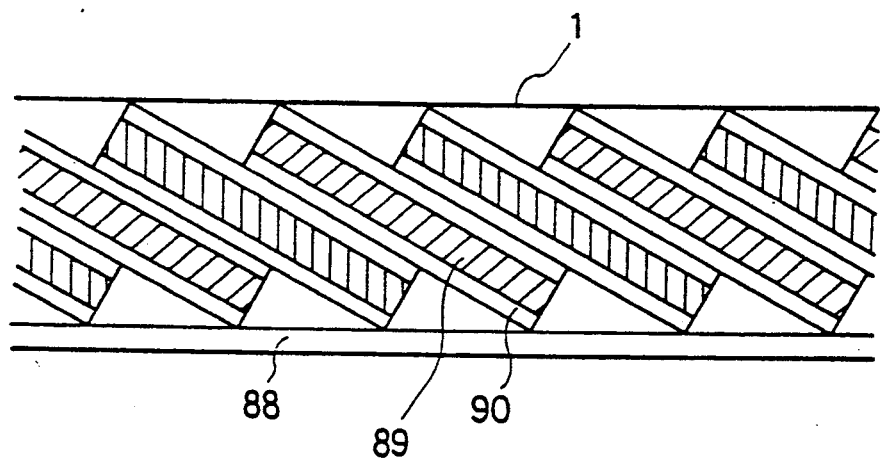
FIG. 9 shows a conventional track pattern of a magnetic tape.

In the figure, switching circuits 22, 23 and 37 are closed to the R side in the recording mode. For recording, a video signal input to the terminal 3 is processed by the recording process circuit 4, is amplified by the recording amplifier 5 and supplied to the recording heads 6 and 7 with the signal being recorded on the magnetic tape 1 with these heads alternately. An audio signal input to the input terminal 19 is processed by FM modulation, for example, in the recording process circuit 20, is amplified by the recording amplifier 21 and supplied to the audio heads 24 and 25 through the switching circuits 22 and 23 with the signal being recorded on the magnetic tape 1 with these heads alternately. The video signal input to the input terminal 3 is also supplied to the control signal process circuit 36 for generating a control signal in accordance with the vertical synchronizing signal of the video signal, for example. The control signal is supplied to the control head 35 through the switching circuit 37 and is recorded on the magnetic tape 1. The magnetic tape 1 is moved by the capstan motor 2 and the capstan motor is controlled by the motor control circuit 30 based on a reference signal supplied to the input terminal 31 so as to maintain the running speed of the magnetic tape 1 constant. The recording video heads 6 and 7, the playback video heads 8 and 9, and the audio heads 24 and 25 are mounted on the same rotating cylinder (not shown in FIG. 1). On the magnetic tape 1, a video signal is recorded by the video recording heads 6 and 7 over the recording track of an audio signal formed by the audio heads 24 and 25 so that an audio signal is recorded on a deep layer and a video signal is recorded on a shallow layer of the magnetic tape 1, and a track pattern as shown in FIG. 9 is obtained.

In the playback mode, switching circuits 22, 23 and 37 are closed to the P side. For playback, a video signal recorded on the magnetic tape 1 is picked up by playback heads 8 and 9 alternately, and each of these signals is amplified with playback amplifiers 12 and 13, respectively, and by way of a switching circuit 14, which is alternately switched between two positions, the signals are joined to form a continuous video signal. The video signal is processed by the playback process circuit 17 and is output from the output terminal 18. An audio signal recorded on the magnetic tape 1 is picked up by audio heads 24 and 25 alternately, and these signals are supplied to the playback amplifiers 26 and 27 to be amplified respectively through the switching circuits 22 and 23, and by way of a switching circuit 28, which is alternately switched between two positions, the signals are joined to form a continuous audio signal. The audio signal is processed with the playback process circuit 32 and is output from the output terminal 33.

An audio signal from the switching circuit 28 is supplied to the tracking arrangement 29 and the envelope of the signal is detected to form a tracking compensation signal which expresses the tracking condition of audio heads 24 and 25 for the audio track on the magnetic tape 1. A control signal picked up from the magnetic tape 1 by the control head 35 and the reference signal from the input terminal 31 are supplied to the motor control circuit 30, and a phase difference therebetween is detected to form a phase control signal for the capstan motor 2. The phase control signal is compensated by the tracking compensation signal from the tracking arrangement 29. In this manner, the running condition of the magnetic tape 1 is controlled to maximize the audio signal envelope supplied to the tracking arrangement. That is, to control the running condition of the magnetic tape so that the audio heads 24 and 25 are placed in a correct tracking condition for the audio track on the magnetic tape 1 independently of control of the tracking condition for the video head.

A playback video signal output from the switching circuit 14 is supplied to the tracking arrangement 15, and the signal level is detected to form a tracking compensation signal. The playback video heads 8 and 9 are mounted on displacement devices 10 and 11, respectively, and the displacement devices 10 and 11 are controlled in accordance with the tracking compensation signal from the tracking arrangement 15. In this manner, the displacement devices 10 and 11 displace the playback video heads 8 and 9 in the width direction of the video track to maximize the video signal level supplied to the tracking arrangement 15, whereby the playback video heads 8 and 9 ar placed in a correct tracking condition for the video track on the magnetic tape 1.

As described, the running condition of the magnetic tape 1 is controlled in response to the output of the tracking arrangement 29 so that the audio heads 24 and 25 perform correct tracking for the audio track on the magnetic tape 1 independently of control of the tracking condition for the video heads, and in this running condition, the positions of the playback video heads 8 and 9 are controlled to perform correct tracking for the video track on the magnetic tape 1 in accordance with the tracking arrangement 15 and the displacement means 10 and 11.

At a starting time, if the tracking arrangements 29 and 15 are simultaneously activated, the running phase of the magnetic tape 1 is changed in response to the tracking compensation signal from the tracking arrangement 29, so that the video signal level picked up by the playback video heads 8 and 9 is also changed with the above-mentioned change, and the tracking arrangement 15 is influenced thereby, which effects fluctuation of the playback video heads 8 and 9.

To prevent the above-mentioned phenomenon, in accordance with the present invention, the tracking arrangement 15 is controlled in accordance with the tracking arrangement 29. At first, the tracking arrangement 29 is operated to control the running phase of the magnetic tape 1. At this time, the tracking arrangement 15 is not activated, and the positions of the playback video heads are fixed. When the audio heads 24 and 25 are made to perform correct tracking for the audio track on the magnetic tape 1 and the level of a played back audio signal becomes a maximum, the tracking arrangement 29 maintains or holds the tracking compensation signal at such time, and at the same time the tracking arrangement 15 is activated. With this operation, the displacement devices 10 and 11 are controlled and the playback video heads 8 and 9 are displaced. When the playback video heads 8 and 9 are made to perform correct tracking and the level of a played back video signal is maximized, the tracking arrangement 15 maintains or holds the tracking compensation signal at such time and fixes the positions of the playback video heads 8 and 9.

In another manner of operation, the tracking arrangements 15 and 29 are simultaneously activated, and in the tracking arrangement 15 a tracking compensation signal obtained from the level of a playback video signal is corrected with a tracking compensation signal obtained from the tracking arrangement 29. In this way, even though the running phase of a magnetic tape 1 is changed with a tracking compensation signal from the tracking arrangement 29, the playback video heads 8 and 9, following the change, move to a correct tracking position for the video track on the magnetic tape 1. The time necessary for the tracking of the playback video heads 8 and 9 and of the audio heads 24 and 25 can be shortened with this manner of operation.

As described above, each of the tracking arrangements 15 and 29 holds the level of a playback signal and outputs a tracking compensation signal at the time when each head is in an optimum tracking condition, and after that the positions of the playback video heads and the running phase of the magnetic tape are fixed in accordance with these compensation signals. At a later time, however, if a large tracking error occurs in the playback video heads or in the audio heads, and the level of a playback signal is lowered greatly (for example, more than 2 dB) from the level which has been held, the tracking operation will be executed again.

Figure 2:
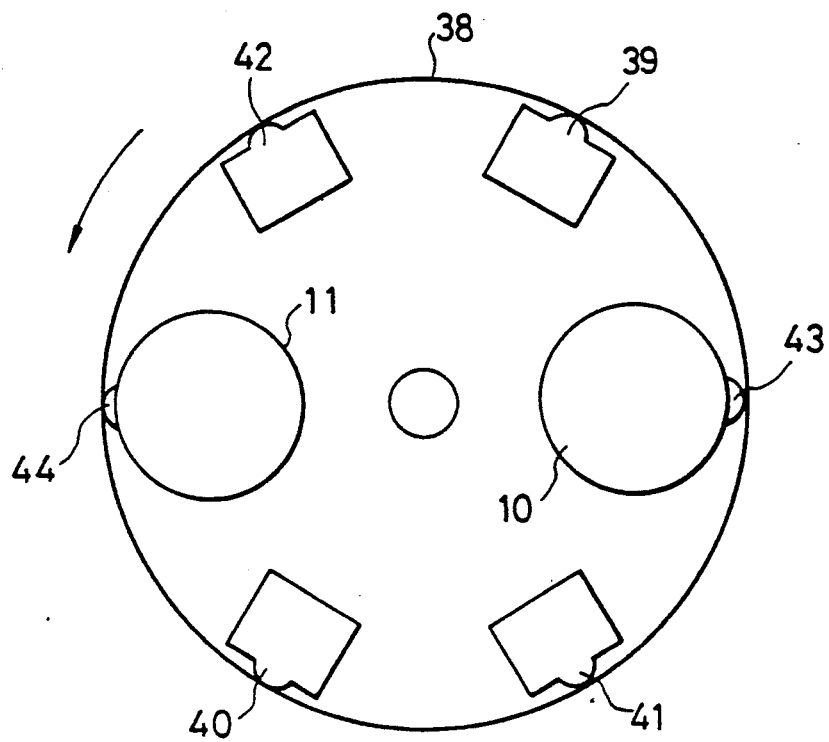
FIG. 2 shows a example of the disposition of heads on a rotating cylinder of FIG. 1.

FIG. 2 is a plan view showing the disposition of the recording video heads 6 and 7, the playback video heads 8 and 9, and the audio heads 24 and 25 which are shown in FIG. 1 on a rotating cylinder wherein 38 is the rotating cylinder and 39 to 44 are head bases, and like parts are designated by the same reference numbers. In the figure, head bases 39 to 44 are spaced at equal intervals on the rotating cylinder 38. The recording video heads 6 and 7 (FIG. 1) are mounted on the head bases 39 and 40, respectively, the audio heads 24 and 25 are mounted on the head bases 41 and 42, respectively, and the playback video heads 8 and 9 are mounted on the head bases 43 and 44, respectively. The head bases 43 and 44 are fixed on the rotating cylinder 38 through the displacement devices 10 and 11, respectively. The rotating cylinder rotates in the direction of the arrow so as to make the audio heads 24 and 25 mounted on the head bases 41 and 42 scan the magnetic tape 1 (FIG. 1) prior to scanning of the tape by the recording video heads 7 and 6 mounted on the head bases 40 and 39. The recording video heads 6 and 7 have different azimuth angles from each other. The playback video head 8 has the same azimuth angle as that of the recording video head 6, and the playback video head 9 has the same azimuth angle as that of the recording head 7. The azimuth angles of the audio heads 24 and 25 are different from each other and also from those of video heads 6 to 9.

Figure 3:
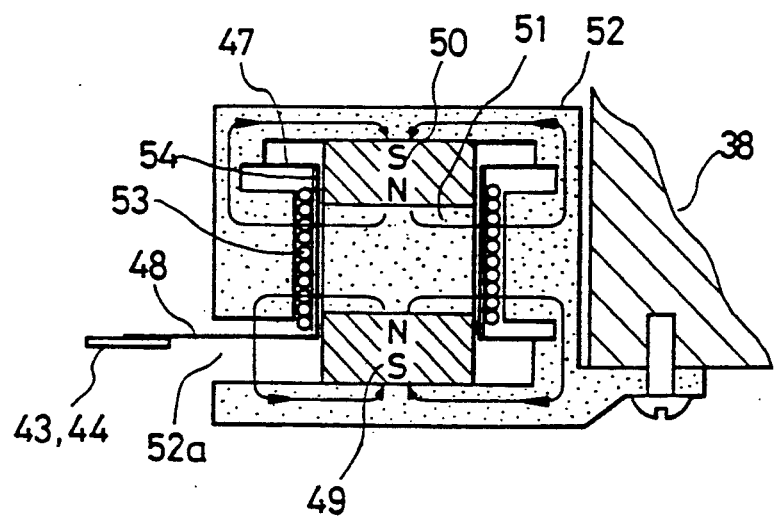
FIG. 3 is a cross-sectional view of a displacement device of a playback video head of FIG. 1.

FIG. 3 is a cross sectional view showing an embodiment of the displacement devices 10 and 11 shown in FIG. 2 wherein 47 and 48 are flat springs, 49 and 50 are permanent magnets, 51 and 52 are yokes, 52a is a through hole, 53 is a coil, 54 is a coil bobbin, and like parts are designated by the same reference numbers. In the figure, the yoke 52 has a cylindrical shape and a bottom part which is fixed by screws to the rotating cylinder 38. Two permanent magnets 49 and 50 are disposed within the yoke 52, and the yoke 51 is interposed between the magnets so as to form a united or unitary structure. Centering the united structure, the cylindrical coil bobbin 54 is positioned for movement along the united structure. The coil 53 is wound on the coil bobbin 54, and an end of the coil bobbin 54 is held by a perforated disk-shaped flat spring 47 which is fixed to the inside surface of the yoke 52 and the coil bobbin is held on the other end thereof by a perforated disk-shaped flat spring 48 which is fixed to the yoke. The flat spring 48 has an arm protruding beyond the outer periphery of the yoke 52 through the through hole 52a provided in the wall of the yoke 52. On the tip of the flat spring 48, the head base 43 or 44 is mounted. The magnetic path of each of permanent magnets 49 and 50 is indicated by the corresponding arrow and passes through the yoke 51, an air gap between the yokes 51 and 52, and the yoke 52. The coil 53 is disposed in the air gap, and the magnetic flux of each of permanent magnets 49 and 50 passes through the coil 53. When the coil 53 is energized, a Lorentz force occurs corresponding to the quantity of the current, whereby the coil 53 displaces against the force of the flat spring 47. The current is supplied as a tracking compensation signal from the tracking arrangement 15 shown in FIG. 1, so that the coil 53 displaces by amount corresponding to the tracking compensation signal and at the same time the playback video heads 8 and 9 mounted on the head bases 43 and 44 are displaced.

As mentioned above, in this embodiment, referring to the track pattern as shown in FIG. 9, even if the phase relation between the audio track 89 and the video track 90 is shifted, it is possible to effect control so that the audio heads 24 and 25, and the video heads 8 and 9 are in correct tracking conditions for the audio track 89 and for the video track 90, respectively.

Figure 4:
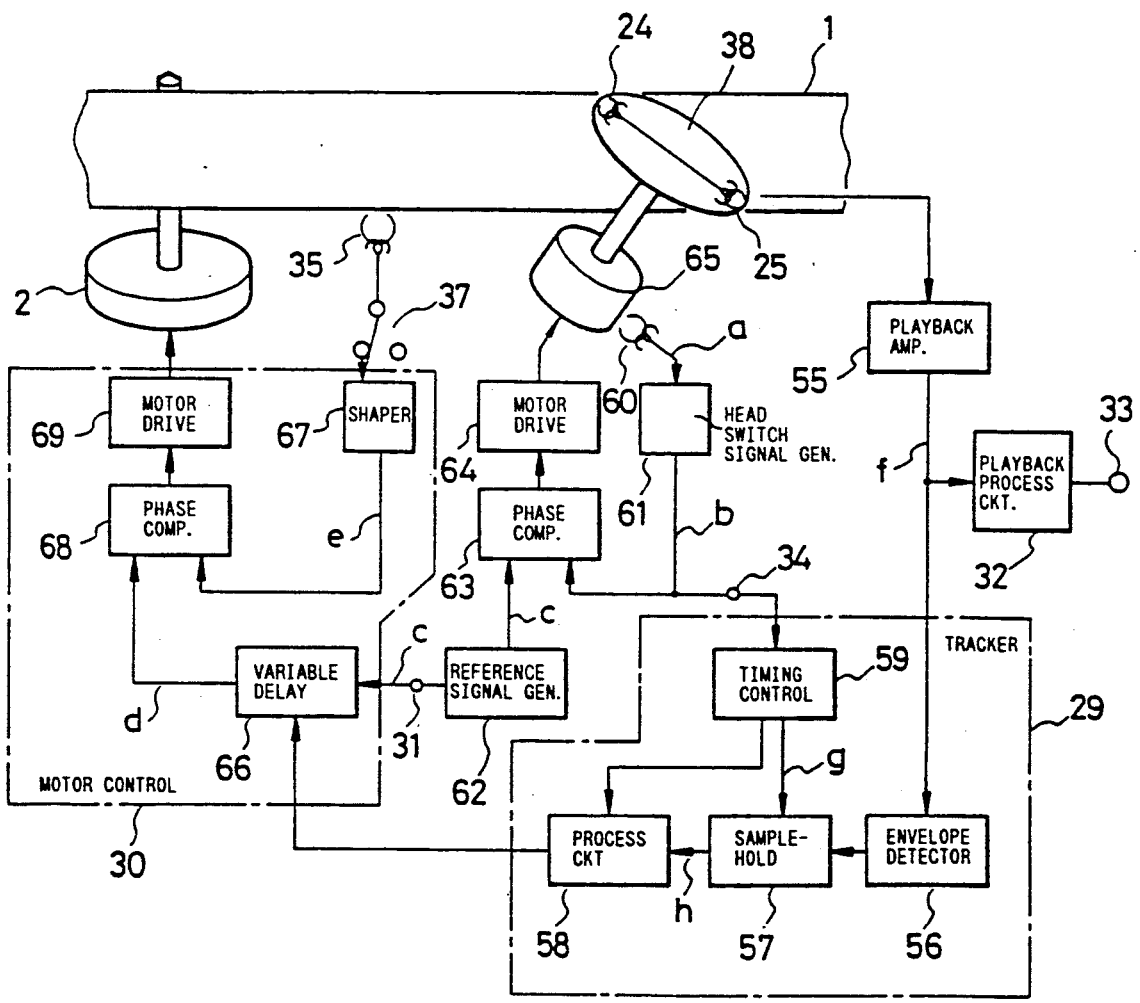
FIG. 4 is a block diagram of a tracking arrangement for an audio head and a motor control circuit for a capstan motor of FIG. 1.

FIG. 4 is a block diagram showing an embodiment of the tracking arrangement 29 and the motor control circuit 30 as shown in FIG. 1, wherein 55 is a playback amplifying arrangement including the switching circuits 22, 23 and 28, and the playback amplifiers 26 and 27. The tracking arrangement 29 includes an envelope detector 56, a sample-hold circuit 57, a process circuit 58; and a timing control circuit 59. There are also shown a tachometer (tach) head 60, a head switch signal generating circuit 61, a reference signal generating circuit 62; a phase comparator 63; a motor driving circuit 64; a cylinder motor 65. The motor control circuit 30 includes a variable delay circuit 66, waveform shaper 67; a phase comparator 68, and a motor driving circuit 69. Like parts are designated by the same reference numbers, it being noted that the description of the video signal system is omitted herein.

Figure 5:
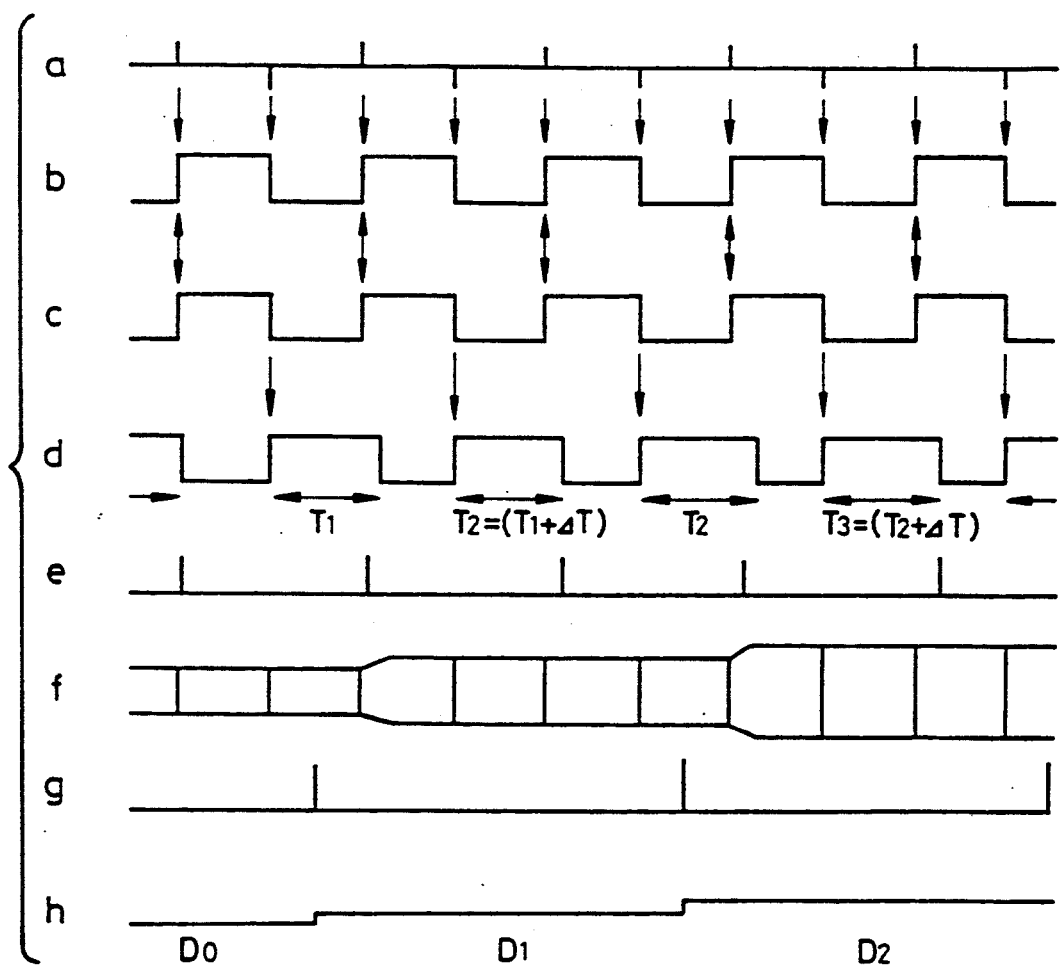
FIG. 5 shows waveforms of signals of various parts in FIG. 4.

FIG. 5 shows signal waveforms of the parts shown in FIG. 4 with the signals corresponding to those in FIG. 4 being designated by the same letters. In FIG. 4 and FIG. 5, the cylinder motor 65 is driven by the driving circuit 64, and a tach pulse "a" which expresses the rotary phase of the cylinder motor 65 is generated by the tach head 60. The tach pulse "a" is supplied to the head switch signal generating circuit 61 for generating a head switch signal "b" having a frequency of 30 Hz. The head switch signal "b" is phase-compared by the phase comparator 63 with a reference signal "c" of 30 Hz output from the reference signal generating circuit 62, and a phase control signal is generated corresponding to the phase difference. The motor driving circuit 64 is controlled in accordance with the phase control signal so that the cylinder motor 65 rotates to make the head switch signal "b" become phase-locked to the reference signal "c". The head switch signal "b" is used for the switching control of the switching circuits 14 and 28. A control signal played back from the magnetic tape 1 with the control head 35 is supplied to the motor control circuit 30 through the switching circuit 37, and it is formed into a control signal "e" of 30 Hz in the waveform shaping circuit 67. The reference signal "c" from the reference signal generating circuit 62 is delayed in the variable delay circuit 66. The delayed reference signal "d" delayed by the variable delay circuit 66 and the control signal "e" from the waveform shaping circuit 67 are phase-compared by the phase comparator 68 for generating a phase control signal corresponding to the phase difference therebetween. The motor driving circuit 69 controls the rotary phase of the capstan motor 2 corresponding to the phase control signal. In this manner, the running phase of the magnetic tape 1, that is, the positional relation between the audio track on the magnetic tape 1 and the scanning loci of the audio heads 24 and 25, is set to make the phase relation between the reference signal "d" from the variable delay circuit 66 and the control signal "e" from the waveform shaping circuit 67 to be a specified value. The tracking arrangement 29 sets the delay quantity D of the variable delay circuit 66 to have such a phase relation between the reference signal "d" and the control signal "e" as to make the audio track on the magnetic tape 1 coincide with the scanning loci of the audio heads 24 and 25.

As described above, the rotating cylinder 38 is rotated by the phase-controlled cylinder motor 65, and an audio signal is picked up from the magnetic tape 1 by the audio heads mounted on the rotating cylinder 38. The audio signal from the audio heads 24 and 25 is made to be a continuous audio signal "f" in the playback amplifier arrangement 55, and it is supplied to the playback process circuit 32 and the tracking arrangement 29.

The tracking arrangement 29 comprises the timing control circuit 59, the envelope detector 56, sample-hold circuit 57 and a process circuit 58. The supplied audio signal "f" is envelope detected by the envelope detector, and the envelope level is sample-held at the timing of a sampling pulse "g" from the timing control circuit 59. The sampling pulse "g" is a pulse signal of 15 Hz formed from the head switch signal "b" of 30 Hz from the head switch signal generating circuit 61, and the timing coincides with a point of time approximately at the center of the period of playback scanning on the magnetic tape 1 by either of the audio heads 24 or 25. The output data "h" of the sample-hold circuit 57 are taken into the process circuit 58 at the timing of the clock pulses from the timing control circuit 59.

The process circuit 58 compares the output data "h" of the sample-hold circuit 57 newly taken in with that data taken in at the preceding time. If there is a level difference between the present and preceding data, the process circuit 58 generates a delay quantity control signal which changes the delay quantity D in the variable delay circuit 66 by ΔT. In other words, at the time of starting or when the playback level of the audio heads 24 and 25 is lowered greatly, the process circuit 58 takes in the output data "h" of the sample-hold circuit 57, and outputs a delay quantity control signal which changes the delay quantity D of the variable delay circuit 66 by ΔT in a direction (for example in a direction of increase). Thereby, the phase of the reference signal "d" is changed by ΔT, and the running phase of the magnetic tape 1 is changed. When the running condition of the magnetic tape 1 has reached a stable condition, the process circuit takes in the next output data "h", and if it is larger than the output data "h" in the preceding time, a delay quantity control signal is output which changes the delay quantity D of the variable delay circuit 66 by ΔT in the same direction as the case mentioned in the above. In contrast, when the newly taken in output data "h" is smaller than the preceding output data "h", a delay quantity control signal is output which changes the delay quantity D of the variable delay circuit 66 by ΔT in the opposite direction (for example, in the direction of decrease), and the running phase of the magnetic tape 1 is changed in the opposite direction.

In this manner, each time when the output data "h" of the sample-hold circuit 57 is taken in, the process circuit 58, depending on the relative values, changes the delay quantity of the variable delay circuit 66 one step by one step with ΔT as a unit in a direction to either increase or decrease the output data "h". Thus, the scanning loci of the audio heads 24 and 25 are made to coincide with the audio track on the magnetic tape 1. In a state where the scanning loci of the audio heads 24 and 25 almost coincide with the audio track, the output data "h" of the sample-hold circuit 57 are almost in the optimum state, so that if the delay quantity D of the variable delay circuit 66 is further changed by ΔT in the same direction, the output data is switched to either decrease or increase. Then, the direction if change of the delay quantity D is reversed. That is, of in the beginning the output data "h" increases, soon thereafter the output data is switched to the decreasing direction. After the output data "h" is switched to increase again, if the data is switched to decrease immediately, the audio heads 24 and 25 are in the correct tracking condition for the audio track. When the switching to the decreasing direction is repeated a fixed number of times, the process circuit 58 stops outputting the delay quantity control signal so as to fix the delay quantity D of the variable delay circuit 66 to the value at such time.

The process circuit 58 holds the output data "h" of the sample-hold circuit 57 when the outputting of the delay quantity control signal is stopped, and supervises the tracking condition of the audio heads 24 and 25 by comparing the data with the succeeding output data "h". The taking-in period of the output data "h" of the sample-hold circuit 57 by the process circuit 58 is set to a time duration for the magnetic tape 1 to perform stable running at a new running phase with the delay quantity control signal.

Figure 6:
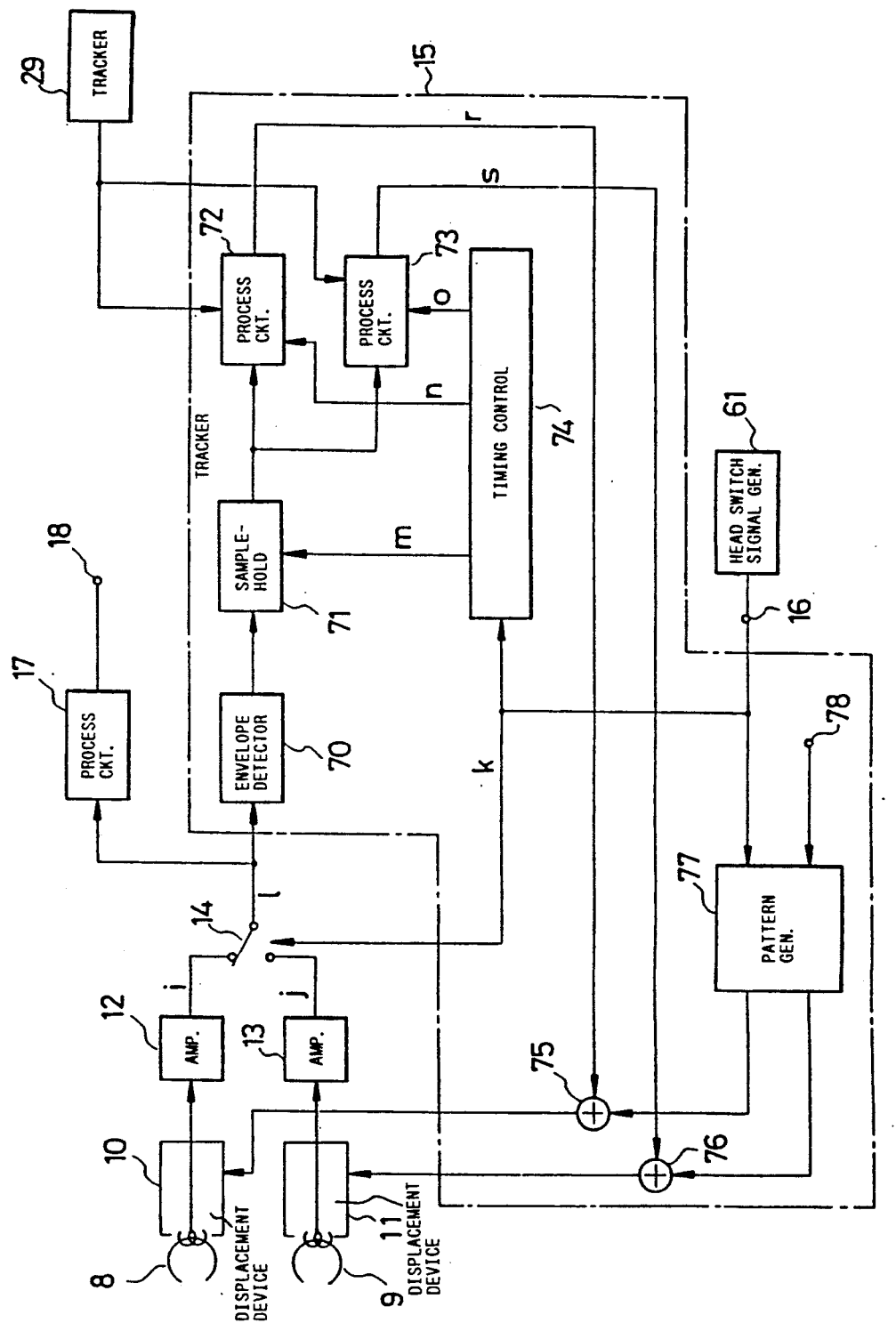
FIG. 6 is a block diagram of a tracking arrangement for a playback video head of FIG. 1.

FIG. 6 is a block diagram showing an embodiment of the tracking arrangement 15 of FIG. 1 wherein like parts are designated by the same reference numbers and wherein 70 is an envelope detector, 71 is a sample-hold circuit, 72 and 73 are process circuits, 74 is a timing control circuit, 75 and 76 are adders, 77 is a pattern generating circuit and 78 is a selection signal input terminal.

Figure 7:
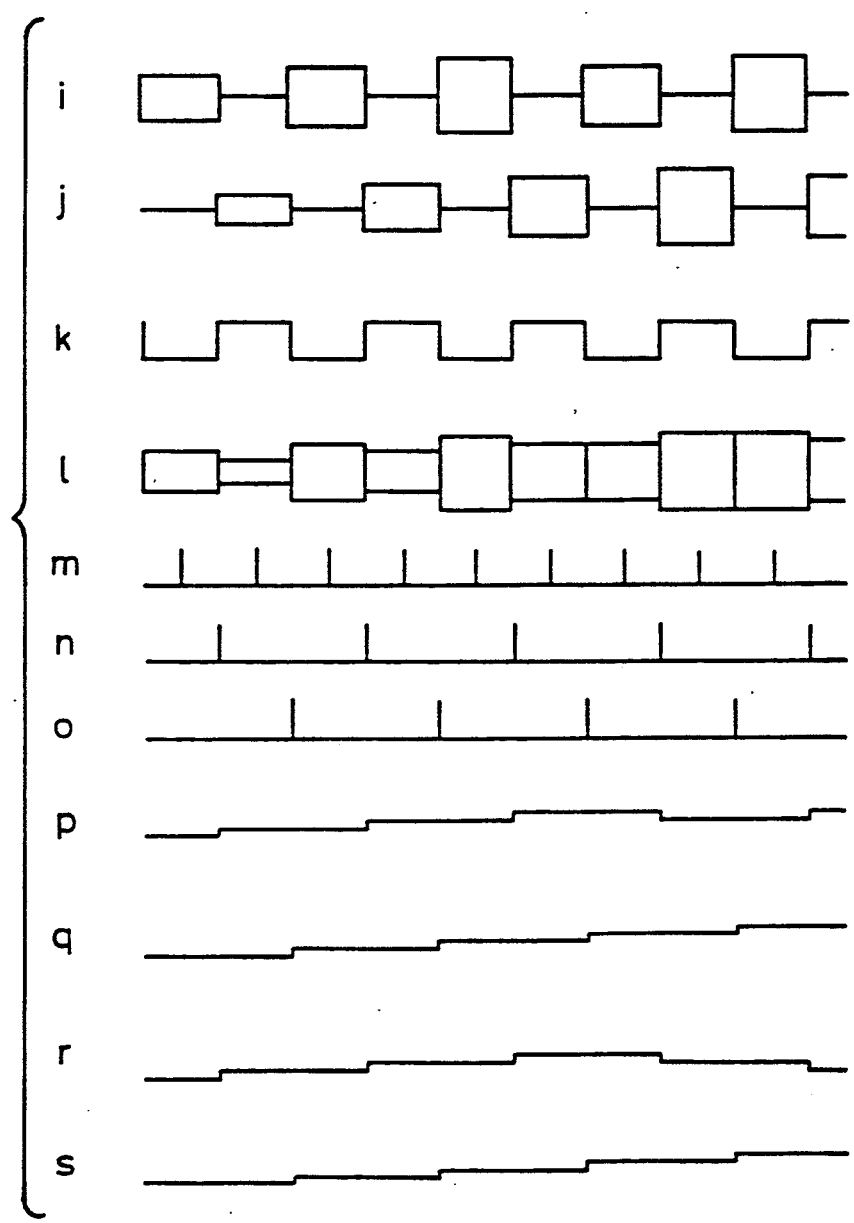
FIG. 7 shows signal waveforms of the parts in FIG. 6.

FIG. 7 shows the waveforms of the signals of the parts shown in FIG. 6 with the signals corresponding to those in FIG. 6 being designated by the same letters. In FIG. 6 and FIG. 7, playback signals "i" and "j" of the playback video heads 8 and 9 output from the playback amplifiers 12 and 13 are joined together to form a continuous video signal "l" by a switching circuit 14 which is controlled with a head switch signal "k" of 30 Hz (a similar signal to the head switch signal "b") output from the head switch signal generating circuit 61. The video signal "l" is supplied to the playback process circuit 17 and the tracking arrangement 15.

In the tracking arrangement 15, the video signal "l" is envelope detected by the envelope detector 70 and is sample-held with timing pulses "m" from the timing control circuit 74. The timing pulse "m" is created from the head switch signal "k", and is generated at the point of time when the playback video heads 8 and 9 scan the middle point of the video track on the magnetic tape 1. Therefore, the level of a video signal "l" when the playback video heads 8 and 9 scan the middle point of the video track is held in the sample-hold circuit 71.

The output data of the sample-hold circuit 71 is taken in to the process circuit 72 at the timing of timing pulses "n" from the timing control circuit 74 and to the process circuit 73 at the timing of timing pulses "o" from the timing control circuit 74. Both of these timing pulses "n" and "o" are created from the head switch signal "k", and the timing pulse "n" is generated during the period in which the sample-hold circuit 71 holds the level of the playback video signal from the playback video head 8, and the timing pulse "o" is generated during the period in which the sample-hold circuit 71 holds the level of the playback video signal from the playback video head 9. In FIG. 7, "p" represents the output data of the sample-hold circuit 71 taken in to the process circuit 72, and "q" represents the output data of the sample-hold circuit 71 taken into the process circuit 73.

The process circuits 72 and 73 process data "p" and "q", respectively, and create the displacement quantity control signals "r" and "s". These displacement quantity control signals "p" and "s" are added to pattern signals from the pattern generating circuit 77 int he adders 75 and 76, and supplied to the displacement devices 10 and 11, respectively. The displacement devices 10 and 11 displace the playback video heads 8 and 9 corresponding to the output signals of adders 75 and 76, respectively.

The process circuits 72 and 73 have similar functions to that of the process circuit 58 shown in FIG. 4, and every time data is taken in, the newly taken in data and the preceding data are compared and if there is any difference therebetween, the displacement quantity control signals "r" and "s" are changed by a fixed level ΔV, with the direction of change being the direction in which the taken in data is made to become a maximum so that the scanning loci of the playback video heads 8 and 9 coincide with the video track on the magnetic tape 1.

The tracking arrangement 15 is controlled by a signal supplied from the tracking arrangement 29. As mentioned above, if the tracking arrangement 15 is activated after the operation of the tracking arrangement 29 is completed, the process circuits 72 and 73 are prohibited from outputting the displacement quantity control signals "r" and "s" until a command signal is delivered thereto from the tracking arrangement 29. When the tracking arrangement 15 and the tracking arrangement 29 are activated so as to operate simultaneously, the displacement quantity control signals "r" and "s" are compensated by the tracking compensation signal from the tracking arrangement 29.

The pattern generator 77 generates pattern signals which regulate the scanning loci of the playback video heads 8 and 9 for each kind of playback mode, except for normal playback mode, and a pattern signal corresponding to the playback mode is selected by the selection signal from the input terminal 78 corresponding to the playback mode to be set, and it is read out repeatedly in synchronization with the head switch signal "k" from the head switch signal generating circuit 61. For example, in the case of a search mode, if the playback video heads 8 and 9 are simply rotated without any pattern signal, these heads scan aslant over a plurality of video tracks on the magnetic tape 1, but if a pattern signal for search playback generated from the pattern generating circuit 77 is provided, the displacement devices 10 and 11 displace the playback video heads to make their scanning loci become parallel to the video tracks on the magnetic tape 1. In this manner, one video track in every several tracks is scanned skippingly.

As mentioned above, the tracking arrangement 15 controls the playback video heads 8 and 9 to be in correct tracking conditions. The positional relation between a playback audio track and a playback video track can be made variable by making the pattern generating circuit 77 generate a pattern signal which displaces playback video heads 8 and 9 by the width of any number of video tracks, so that it is possible to make the timing relation between a playback audio signal and a playback video signal variable by the track.

Figure 8:
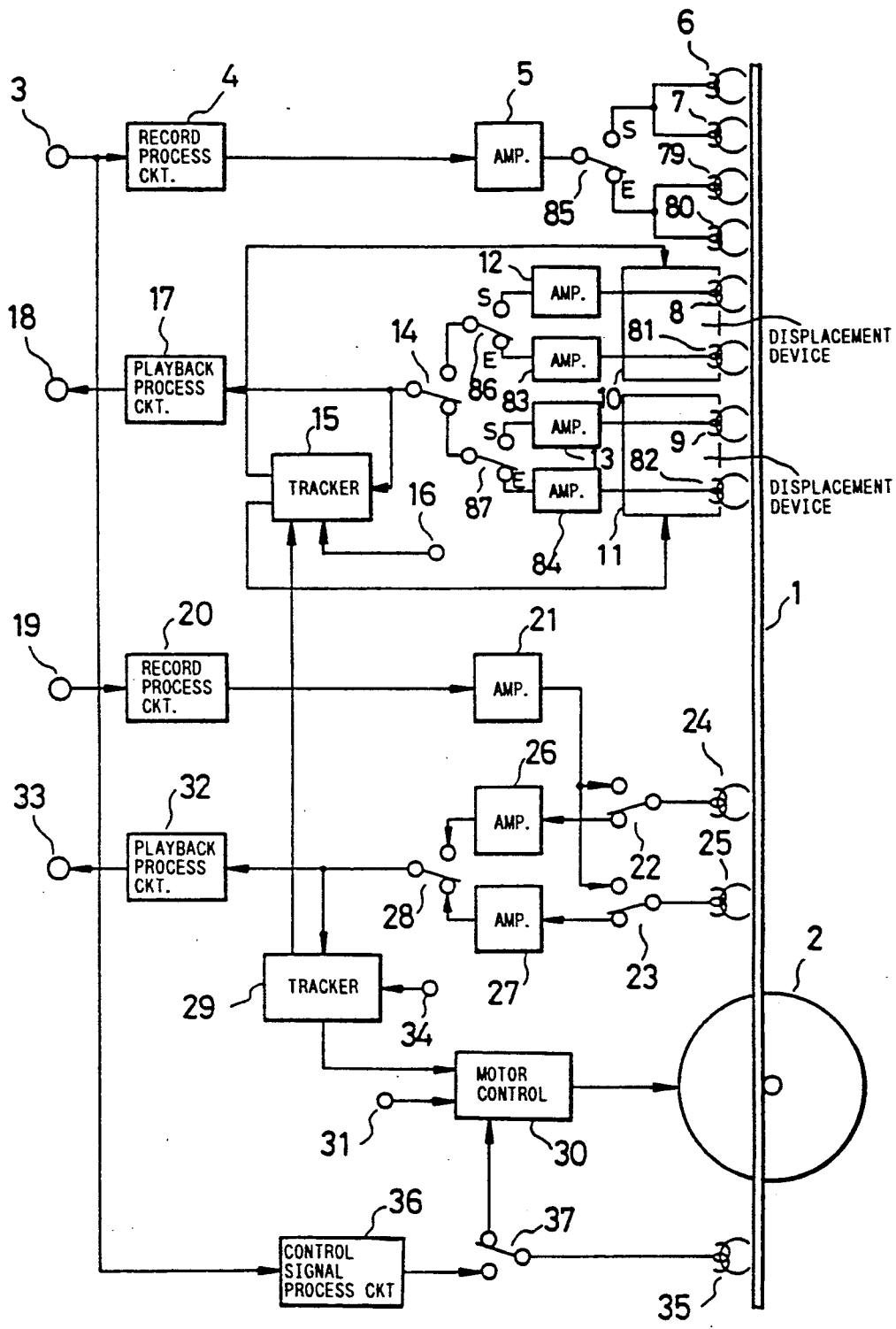
FIG. 8 illustrates, in block diagram form, another embodiment of a tracking apparatus for a magnetic recording and playback device according to the present invention.

FIG. 8 illustrates, in block diagram form, another embodiment of a tracking apparatus for a magnetic recording and playback device according to the present invention wherein like parts are designated by the same reference numbers and wherein 79 and 80 are recording video heads, 81 and 82 are playback video heads, 83 and 84 are playback amplifiers and 85 to 87 are switching circuits.

In this embodiment, it is possible to select a standard recording and playback mode or a long-play recording and playback mode (for example 3 times mode). A recording video head and a playback video head are provided for each of these modes. In FIG. 8, recording video heads 6 and 7, and playback video heads 8 and 9 are for a standard recording and playback mode; recording video heads 79 and 80 and playback video heads 81 and 82 are for a long-play recording and playback mode; and an optimum head width is set for each kind of these heads.

In the standard recording mode, a switch circuit 85 is closed to the S side, and a video signal amplified by the recording amplifier 5 is supplied to the recording video heads 6 and 7 to be recorded on the magnetic tape 1. In the long-play mode, the switch circuit 85 is closed to the E side, and a video signal is recorded on a magnetic tape 1 by the recording video heads 79 and 80.

In the standard playback mode, switch circuits 86 and 87 are closed to the S side and video signals are picked up from the magnetic tape 1 with the playback video heads 8 and 9 alternately. These video signals are amplified by the playback amplifiers 12 and 13, and are supplied to the switch circuit 14 through the switch circuits 86 and 87, to be joined together as a continuous video signal. In the long-play mode, the switch circuits 86 and 87 are closed to the E side and video signals are picked up from the magnetic tape 1 alternately with the video playback heads 81 and 82. These video signals are amplified with the playback amplifiers 83 and 84 and supplied to the switch circuit 14 through switch circuits 86 and 87 to be joined together to form a continuous video signal.

The playback video heads 8 and 81 are mounted on the displacement device 10, and the playback video heads 9 and 82 are mounted on the displacement device 11. In the standard playback mode, a picked up video signal picked up by playback video heads 8 and 9 is supplied to the tracking arrangement 15, whereby displacement devices 10 and 11 position the playback video heads 8 and 9 in a correct tracking condition. In a similar manner, in the long-play mode, a picked up video signal picked up by the playback video heads 81 and 82 is supplied to the tracking arrangement 15, whereby the displacement devices 10 and 11 position the playback video heads 81 and 82 in a correct tracking condition. Other than the aforedescribed parts, the remaining parts are similar to those shown in FIG. 1, so that an explanation thereof is omitted herein.

Although several embodiments of the present invention have been described above, the present invention is not limited to these embodiments. For example, in the above-described embodiments, separate heads are provided for recording and for playback of a video signal, but a video head can be used for recording and for playback in common. In this case, the tracking arrangement 15 is operated only in a playback mode. FIG. 4 and FIG. 6 show examples of the tracking arrangement 29, the motor control circuit 30 and the tracking arrangement 15, but other constructions having similar functions can be utilized. Further, although the playback video heads have been described as being mounted for displacement by displacement devices 10 and 11, the audio heads can be mounted and operated in such a manner with the video head tracking error being utilized to control the rotary phase of the capstan motor.

According to the present invention, audio heads and video heads can be controlled independently. Therefore even if there are variations in the positional relations between an audio track and a video track, correct tracking conditions of audio heads and video heads can be obtained. Thereby, the playback image of the best picture quality and the playback audio sound of the best sound quality can be obtained simultaneously.

While we have shown and described several embodiments in accordance with the present invention, it is understood that the same is not limited thereto but is susceptible to numerous changes and modifications as known to one of ordinary skill in the art, and we therefore do not wish to be limited to the details shown and described herein but intend to cover all such modifications as are encompassed by the scope of the appended claims.

What is claimed is:

1. A tracking apparatus for a magnetic recording and playback device of a helical scan system including at least one audio head and at least one video head provided on a rotating cylinder for enabling recording and playback of an audio signal and a video signal onto and from a magnetic tape, the magnetic tape being driven by a capstan motor, the tracking apparatus comprising one tracking means for detecting an audio tracking error of the at least one audio head for an audio track of the magnetic tape and for generating a tracking compensation signal corresponding to the amount of audio tracking error, and control means responsive to the tracking compensation signal for controlling the rotary phase of the capstan motor in accordance therewith so that the at least one audio head correctly tracks the audio track of the magnetic tape and is controlled independently of control of the video head for video tracking error.

2. A tracking apparatus according to claim 1, further comprising another tracking means for detecting a tracking error of the at least one video head for a video track of the magnetic tape and for generating a video tracking error signal in accordance therewith, displacement means responsive to the video tracking error signal for displacing the at least one video head in a width direction of a video track in accordance therewith so that the at least one video head correctly tracks the video track of the magnetic tape.

3. A tracking apparatus according to claim 2, further comprising means for controlling the operation of the another tracking means so that the another tracking means is activated only after the at least one audio head correctly tracks the audio track in accordance with the operation of the one tracking means.

4. A tracking apparatus according to claim 2, wherein the another tracking means is responsive to the output of the one tracking means for compensating the video tracking error signal for controlling the displacement means in accordance therewith.

5. A tracking apparatus according to claim 1, wherein the rotating cylinder produces a rotation signal in accordance with the rotation thereof, and further comprising reference signal generator means for generating a reference signal, rotation control means responsive to the rotation signal and the reference signal for controlling the rotation of the rotating cylinder, and motor control circuit means for controlling the rotation of the capstan motor in response to the reference signal and a control signal picked up from the magnetic tape.

6. A tracking apparatus according to claim 5, wherein the motor control circuit means includes delay means for delaying the reference signal in accordance with the tracking compensation signal, and drive means for detecting a phase difference between the delayed reference signal and the control signal and for driving the rotation of said capstan motor in accordance with the detected phase difference so that the phase difference is fixed at a predetermined phase amount and a maximum amplitude of a reproduced audio signal is obtained.

7. A tracking apparatus for a magnetic recording and playback device of a helical-scan system including at least first head means and second head means disposed on a rotating cylinder for recording and playback of an audio signal and a video signal on a magnetic tape with the first and second head means, a capstan motor for driving the magnetic tape, the tracking apparatus comprising first tracking means for detecting a tracking error of one of the first and second head means for one of an audio track and a video track on the magnetic tape and for generating a tracking compensation signal for controlling a rotary phase of the capstan motor in accordance with the amount of tracking error so that the one of the first and second head mean correctly tracks the one of the audio track and the video track and is controlled independently of control of the other of the first and second head means for tracking error, second tracking means for detecting a tracking error of the other of the first and second head means for the other of the audio track and video track on the magnetic tape and providing a tracking error output signal indicative thereof, displacement means responsive to the tracking error signal from the second tracking means for controlling the displacement of the other of the first and second head means in a width direction of the track so that the other of the first and second head means correctly tracks the other of the audio and video track on the magnetic tape.

8. A tracking apparatus according to claim 7, wherein the first head means is at least one audio head and tracks an audio track, the first tracking means detecting an audio tracking error, and the second head means is at least one video head and the second tracking means detects a video tracking error.

9. A tracking apparatus according to claim 7, wherein the first head means is at least one video head for tracking a video track on the tape and the first tracking means detected a video tracking error, the second head means is at least one audio head and the second tracking means detects an audio tracking error, the displacement means displacing the at least one audio head in response to the output from the second tracking means.

* * * * *